(12) United States Patent
Walton et al.

(10) Patent No.: US 7,309,117 B1
(45) Date of Patent: Dec. 18, 2007

(54) MULTI-VALUED RASTER ELEMENTS AS A TECHNIQUE TO REDUCE THE MEMORY REQUIREMENTS AND COMPUTATION COMPLEXITY OF ADVANCED INK JET SYSTEMS

(75) Inventors: Derek T. Walton, Bolton, MA (US); Brendan P. Mullaly, Nashua, NH (US)

(73) Assignee: Sigmatel, Inc., Austin, TX (US)

( * ) Notice: Subject to any disclaimer, the term of this patent is extended or adjusted under 35 U.S.C. 154(b) by 336 days.

(21) Appl. No.: 11/032,616

(22) Filed: Jan. 10, 2005

Related U.S. Application Data

(60) Provisional application No. 60/535,399, filed on Jan. 9, 2004.

(51) Int. Cl.
*B41J 2/205* (2006.01)
*G06K 1/00* (2006.01)

(52) U.S. Cl. ............................. 347/15; 358/1.2; 358/1.9

(58) Field of Classification Search .................. 347/15, 347/43, 41; 358/1.2, 1.9, 3.23, 502
See application file for complete search history.

(56) References Cited

U.S. PATENT DOCUMENTS 7,222,928 B2 * 5/2007 Fujimori ....................... 347/15

* cited by examiner

*Primary Examiner*—Lamson Nguyen
(74) *Attorney, Agent, or Firm*—Toler Schaffer LLP

(57) ABSTRACT

A printing system comprising a set of nozzles for applying a color component, wherein each of the nozzles in the set is configured to apply a different effective color intensity; and a raster associated with the set of nozzles, the raster comprising a plurality of cells wherein each cell in the plurality of cells comprises at least one element which represents the effective color intensity to be applied to an area by the set of nozzles, wherein the number of elements in a cell is less than the range of different effective color intensities.

31 Claims, 9 Drawing Sheets

| Encoding | Interpretation |
|---|---|
| 00 | No drops |
| 01 | 1 dilute drop |
| 10 | 1 small drop |
| 11 | 1 large drop |

Fig. 4

| Encoding | Interpretation | Effective color intensity | Ideal color intensity |
|---|---|---|---|
| 00 | No drops | 0% | 0% |
| 01 | 1 dilute drop | 10% | 33% |
| 10 | 1 small drop | 30% | 67% |
| 11 | 1 large drop | 100% | 100% |

Fig. 5

| Encoding | Interpretation |
|---|---|
| 00 | No drops |
| 01 | 1 small drop |
| 10 | 2 small drops |
| 11 | 1 large drop |

Fig. 7

| Encoding | Interpretation |
|---|---|
| 00 | No drops |
| 01 | 1 small drop |
| 10 | 2 small drops |
| 11 | 3 small drops |

Fig. 8

| Encoding | Interpretation |
|---|---|
| 00 | No drops |
| 01 | 1 small drop |
| 10 | 2 small drops |
| 11 | 4 small drops |

Fig. 9

MULTI-VALUED RASTER ELEMENTS AS A TECHNIQUE TO REDUCE THE MEMORY REQUIREMENTS AND COMPUTATION COMPLEXITY OF ADVANCED INK JET SYSTEMS

REFERENCE TO PENDING PRIOR PATENT APPLICATION

This patent application claims benefit of pending prior U.S. Provisional Patent Application Ser. No. 60/535,399, filed Jan. 9, 2004 by Derek T. Walton et al. for SSS LOGIC (MULTI-VALUED RASTER ELEMENTS AS A TECHNIQUE TO REDUCE THE MEMORY REQUIREMENTS AND COMPUTATION COMPLEXITY OF ADVANCED INK JET SYSTEMS).

The above-identified patent application is hereby incorporated herein by reference.

FIELD OF THE INVENTION

This invention relates to office automation products in general, and more particularly to printers, fax machines, scanners, copiers and the like. Even more particularly, this invention relates to the integration of formerly separate functions into single devices such as those sometimes referred to as MFPs (Multi-Functional-Peripherals), and to the integration of multiple functions into a single ASIC (Application-Specific Integrated Circuit) such as those produced by Oasis Semiconductor, Inc. of Waltham, Mass.

BACKGROUND OF THE INVENTION

Overview

This invention relates to the rendering of images as multibit-per-pixel rasters and subsequent mapping to virtual single bit rasters prior to printing on an ink jet engine.

Description of Ink Jet Printing Systems

The ink jet printing systems used in today's low cost ink jet printers and Multi-Functional-Peripherals (MFPs) generally use cyan, magenta, yellow and black (CMYK) inks to produce color prints. In a typical ink jet printing system, a printhead (consisting of a set of nozzles) is used to place drops of these 4 ink types onto the paper.

Simple Ink Jet Printing System

In the simplest ink jet printing system, the print head might consist of 4 different sets of nozzles, with each set of nozzles being used to deliver drops of a different ink type (i.e., C, M, Y or K). Typically, the nozzles making up each nozzle set are nominally designed to deliver a single, fixed size ink drop.

For this simple ink jet printing system, the raw image data which is used to drive the print system is typically organized as 4 bitonal rasters, one for each of the color components C, M, Y and K. For the purposes of the present disclosure, a bitonal raster may be defined as a 2D array of pixel values for which each pixel has 2 possible states, these states being (i) ink drop absent (i.e., "0"), and (ii) ink drop present (i.e., "1") (see FIG. 1).

Advanced Ink Jet Printing Systems

In more advanced ink jet printing systems, there are often more than the simple 4 sets of nozzles. Some ink jet systems, for instance, use two sizes of nozzles for C, M, and Y. In such systems, small drops are used in areas of light tones. In order to obtain the light tones, it is advantageous to use small drops, because each individual small drop is less noticeable to the human eye. In darker regions, in order to obtain full color saturation, and to ensure fast printing time, the larger drops are used in combination with the small drops.

Other systems use different sets of nozzles to deliver dilute ink to obtain similar results instead of using standard ink. Similar to the use of the small drops described above, the dilute ink drops are used in areas of light tones because they are less noticeable to the human eye.

Yet other ink jet printing systems exist which use combinations of small, large, and dilute ink drops.

Thus it will be appreciated that more advanced printing systems often use more than the 4 simple sets of nozzles. As a result, the raw image data which is used to drive the print system typically needs to have more than 4 standard bitonal rasters.

To illustrate the need for more than 4 standard bitonal rasters, the following is an example of a printing system which uses a single set of fixed size K nozzles, but uses 3 sets of nozzles for each color component (CMY). The 3 sets of color nozzles are configured to deliver color ink drops of three types: small drops, large drops, and dilute drops. Such a system can both produce very high quality photos (small drop size and dilute inks) but still print quickly (large drops to reach color saturation with minimal head passes). For this system, it is apparent that 10 bitonal rasters would be required to represent drops for the variety of nozzle types (see FIG. 2).

The Problem

Advanced ink jet printing systems (such as those with more than the simple set of 4 CMYK rasters) place additional memory and computation requirements on the image processing and data formatting system. For ink jet printing systems which rely on a host computer for image processing and data formatting tasks, the additional requirements are not a problem. However, for embedded systems (such as MFPs with standalone copy capability, photo-print capability, etc.) these additional requirements can be substantial, resulting in increased system cost and/or reduced performance.

For each raster required by the heads, a partial page buffer is typically required to support the process of converting the raster data into the data sequence fed to the ink jet heads. This partial page buffer must span the width of the image and have sufficient "height" to span the height of the ink jet head nozzle set. This buffer can represent a significant fraction of an MFPs available memory. Increasing the number of rasters, of course, increases the memory requirements.

The increased number of rasters also increases the image processing computational load. This is because adding additional rasters means that more pixel components will need to pass through the image processing pipeline.

Computationally expensive operations like 3D color space lookup/interpolation and error diffusion must therefore support higher pixel component throughput.

SUMMARY OF THE INVENTION

To allow for "computationally expensive" operations in printing systems without the need for high memory and computation requirements, the present invention teaches a technique which supports advanced ink jet print systems with more than the 4 simple nozzle types while avoiding the need for an individual bitonal raster for each nozzle type, thereby reducing the additional memory and computation complexity required to drive such advanced ink jet print systems.

In one preferred embodiment of the present invention, there is provided a printing system comprising:

a set of nozzles for applying a color component, wherein each of the nozzles in the set is configured to apply a different effective color intensity; and a raster associated with the set of nozzles, the raster comprising a plurality of cells;

wherein each cell in the plurality of cells comprises at least one element which represents the effective color intensity to be applied to an area by the set of nozzles, wherein the number of elements in a cell is less than the range of different effective color intensities.

In another preferred embodiment of the present invention, there is provided a method for printing comprising:

providing a set of nozzles for applying a color component, wherein each of the nozzles in the set is configured to apply a different effective color intensity; and providing a raster associated with the set of nozzles, the raster comprising a plurality of cells, wherein each cell in the plurality of cells comprises at least one element which represents the effective color intensity to be applied to an area by the set of nozzles, wherein the number of elements in a cell is less than the range of different effective color intensities; and reading the raster whereby to control the operation of the set of nozzles.

In one preferred embodiment of the present invention, there is provided a printing system comprising:

a set of nozzles for applying a color component, wherein each of the nozzles in the set is configured to apply a different effective color intensity; and a raster associated with the set of nozzles, the raster comprising a plurality of cells;

wherein each cell in the plurality of cells represents the effective color intensity to be applied to an area by the set of nozzles; and wherein each cell in the plurality of cells comprises a single non-vector element.

In one preferred embodiment of the present invention, there is provided a printing system comprising:

a set of nozzles for applying a color component; and a raster associated with the set of nozzles, the raster comprising a plurality of cells;

wherein each cell in the plurality of cells represents the effective color intensity to be applied to an area by the set of nozzles; and wherein each of the different effective color intensities defined by the cell is achieved by a programmable combination of one or more of ink drop size and formulation.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein:

FIG. 4 is a schematic illustration providing an interpretation for each of the four two-bit codes used in two-bit rasters shown in FIG. 3;

FIG. 5 is a schematic illustration providing an interpretation for each of the four two-bit codes, showing differences between effective color intensity and ideal color intensity between adjacent codes;

FIG. 7 is a schematic illustration of alternative set of interpretations for each of the two-bit codes where the inkjet system contains only small and large drops (no dilute drops);

FIG. 8 is a schematic illustration of alternative set of interpretations for each of the two-bit codes where the inkjet system contains only small drops (no large or dilute drops); and FIG. 9 is a schematic illustration of still another alternative set of interpretations for each of the two-bit codes where the inkjet system contains only small drops (no large or dilute drops).

DETAILED DESCRIPTION OF THE PREFERRED EMBODIMENTS

In one embodiment of the present invention, a system is disclosed for supporting advanced ink jet print systems with more than the 4 simple nozzle types while avoiding the need for an individual bitonal raster for each nozzle type.

This system reduces the additional memory and computation complexity required to drive such advanced ink jet print systems.

The system of the present invention uses a fundamentally different approach for the generation and representation of nozzle fire data. More particularly, prior art approaches generate a bitonal raster for each of the different types of ink jet nozzles. In contrast, the system of the present invention generates a smaller number of rasters (i.e., fewer rasters than there are different types of nozzles), but allows each raster element to consist of multiple bits (rather than only a single bit). Then, the multiple bits are used to encode a set of nozzle fire combinations. In one embodiment of the present invention, a table can be used to map the multiple bit encodings to nozzle fires.

Figure 1:
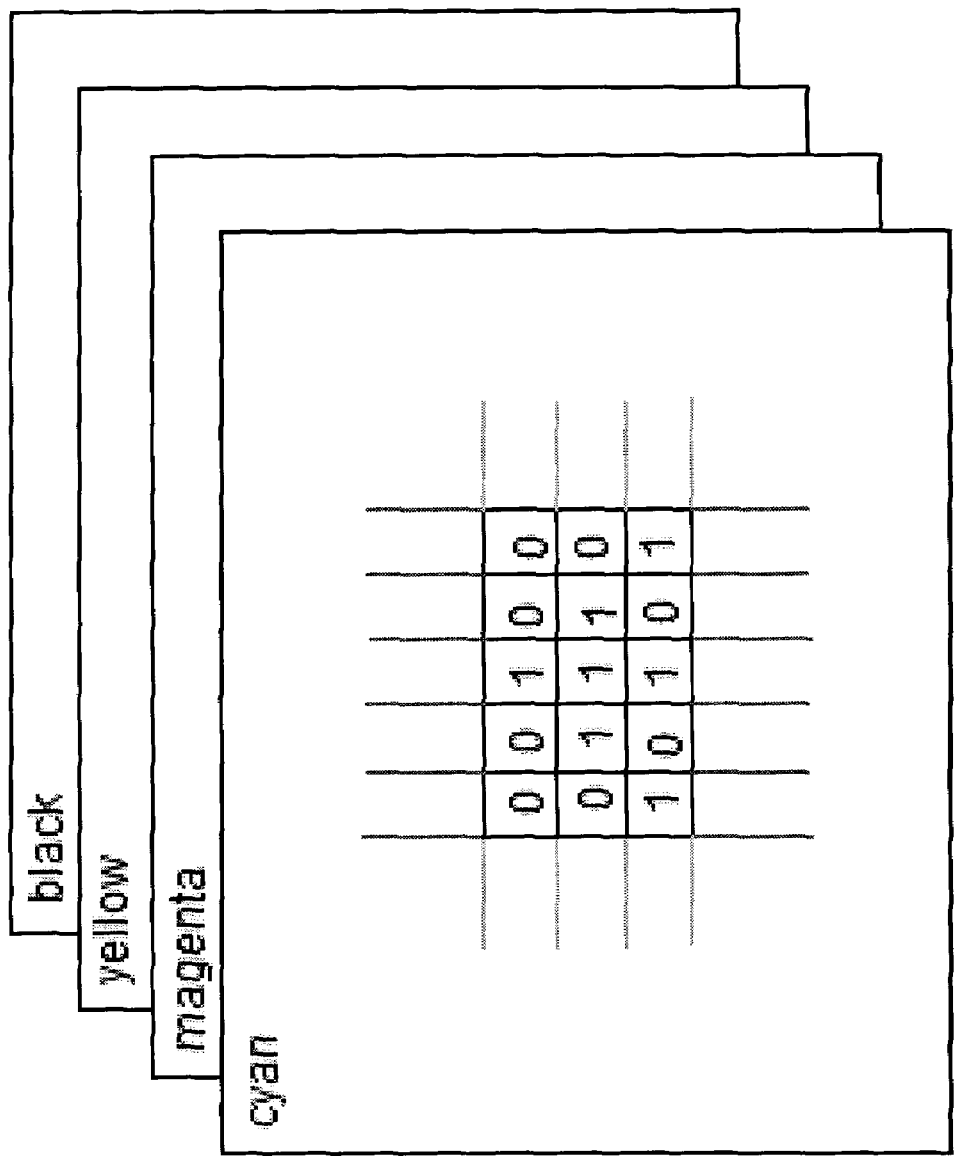
FIG. 1 is a schematic illustration of the four bitonal rasters for a simple four-color print system.
Figure 2:
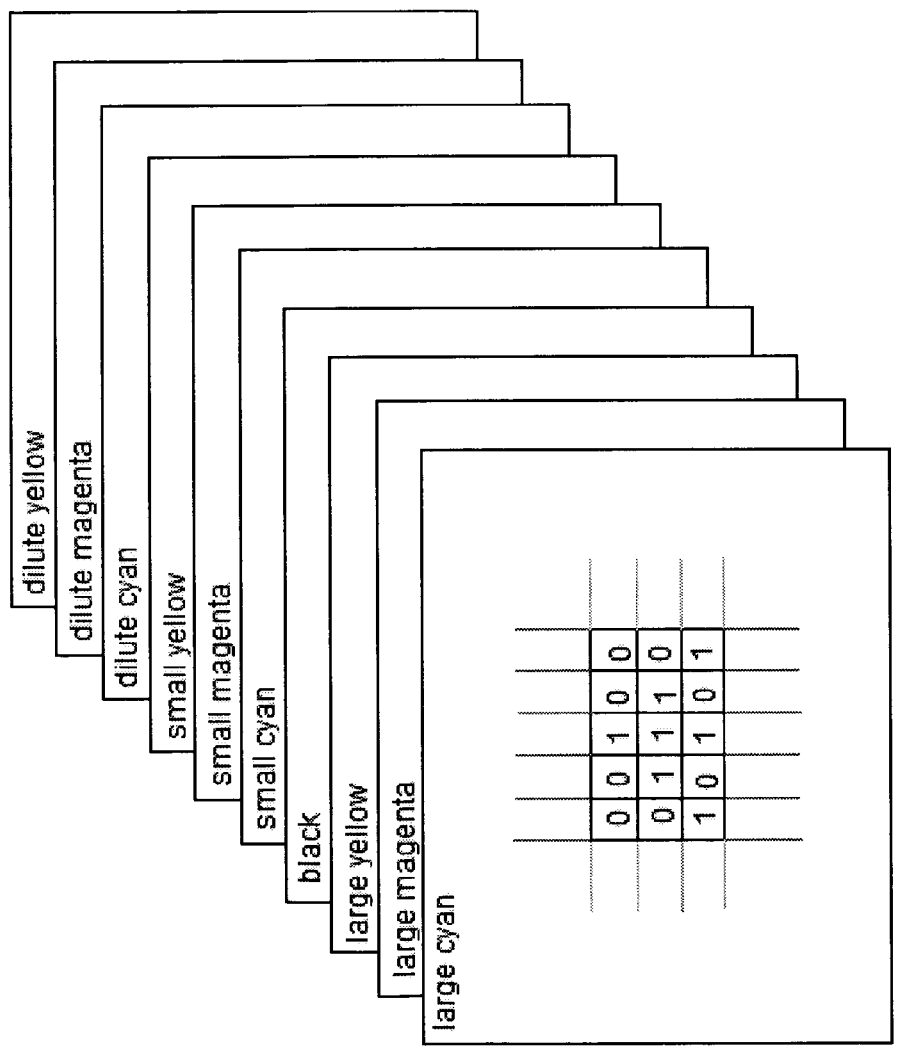
FIG. 2 is a schematic illustration of the ten bitonal rasters for a more complex four-color print system using a single fixed size K nozzle and three sets of nozzles for each color component (CMY)
Figure 3:
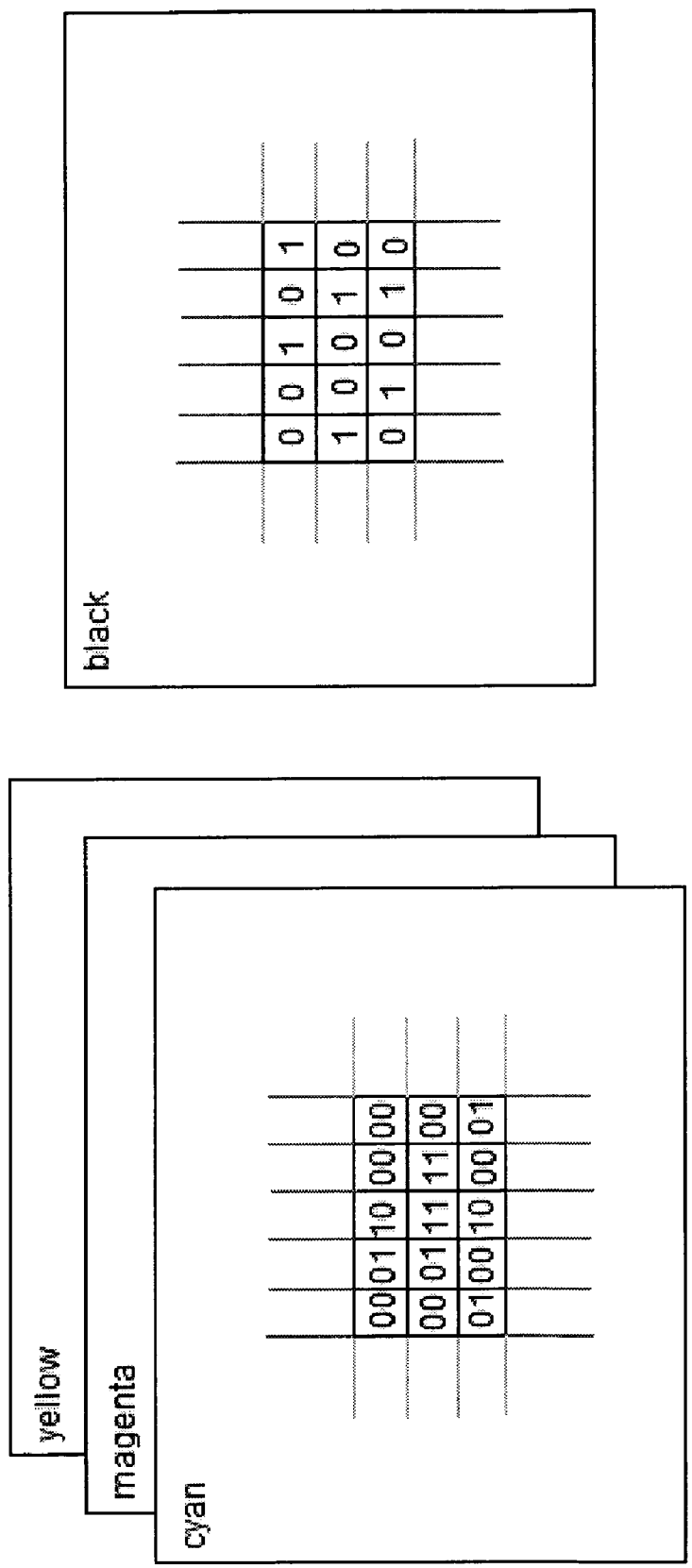
FIG. 3 is a schematic illustration of a novel raster system provided in accordance with the present invention, wherein the ten bitonal rasters of FIG. 2 have been replaced be a single one-bit raster for the K nozzle and three two-bit rasters for the CMY nozzles.

Looking now at FIG. 3, consider an advanced ink jet system which includes three different nozzle types for each color component. In one embodiment of the present invention, the raster data for this system is represented using three 2-bit rasters for the CMY color components, and a single 1-bit raster for the K color component. For the color multi-bit rasters, the present invention provides an interpretation for each of the 4 2-bit codes, as shown in the table of FIG. 4.

When generating rasters based on this selection of 2-bit CMY color components, the imaging pipeline typically uses raster elements with values 00 and 01 to create the lightest shades of color, thereby selecting the visually least noticeable color drops. In dark areas with highly saturated colors, a mix of raster elements of codes 10 and 11 is typically used.

The present invention offers a number of advantages over the prior art.

With respect to memory utilization in the printing system, the system of the present invention uses three color rasters each comprising 2-bit elements, instead of the prior art approach of using nine color rasters each comprising 1-bit elements. Both the system of the present invention and the prior art systems use 1 raster of 1-bit elements for the K color component. Consequently, the technique of the present invention uses a total of (2*3)+1 bits of storage for the set of 4 raster elements at a particular raster grid location.

On the other hand, the prior art approach uses (1*9)+1 bits of storage for the set of 10 raster elements at a particular raster grid location. Thus, the technique of the present invention uses only 70% the memory needed for the printing systems of prior art.

With respect to computational complexity, a printing system typically requires the same amount of computations to create 2-bit rasters elements as it does to create 1-bit elements. So, the relative computational complexity scales with the number of raster elements. Therefore, the system of the present invention is significantly less computationally complex. More particularly, one raster grid location requires 4 raster element computations using the technique of the present invention (3 color raster elements and 1 K element) versus the 10 raster element computations associated with printing systems of prior art (9 color raster elements and 1 K element). This represents a 60% reduction in computational complexity.

ADDITIONAL ASPECTS OF THE PRESENT INVENTION

Use of Tonal Response Curves During Image Processing

In the novel system described above, the encodings for the 2-bit CMY raster were chosen in such a way that increasing binary code will map to increasing visual intensity of the color component. Such a relationship can simplify the image processing required to generate the multi-bit raster. However, it should be appreciated that such a relationship is not a requirement for all embodiments of the present invention.

Another important aspect of the present invention is the use of a tonal response curve. The use of a tonal response curve with the image processing also aids the generation of multi-bit rasters as used in the present invention.

To illustrate the use of a tonal response curve as applied in the present invention, assume that the binary codes for the multi-bit raster element have been ordered such that the increasing binary code maps to the increasing visual intensity of the color component. Once so ordered, it may be found that the differences in visual intensity between adjacent codes are not uniform.

More particularly, it may, for instance, be found that the effective color intensity of the dilute and small drops is less than what would be required to produce an ideal, linear relationship between encoding and effective intensity (see FIG. 5).

Figure 6:
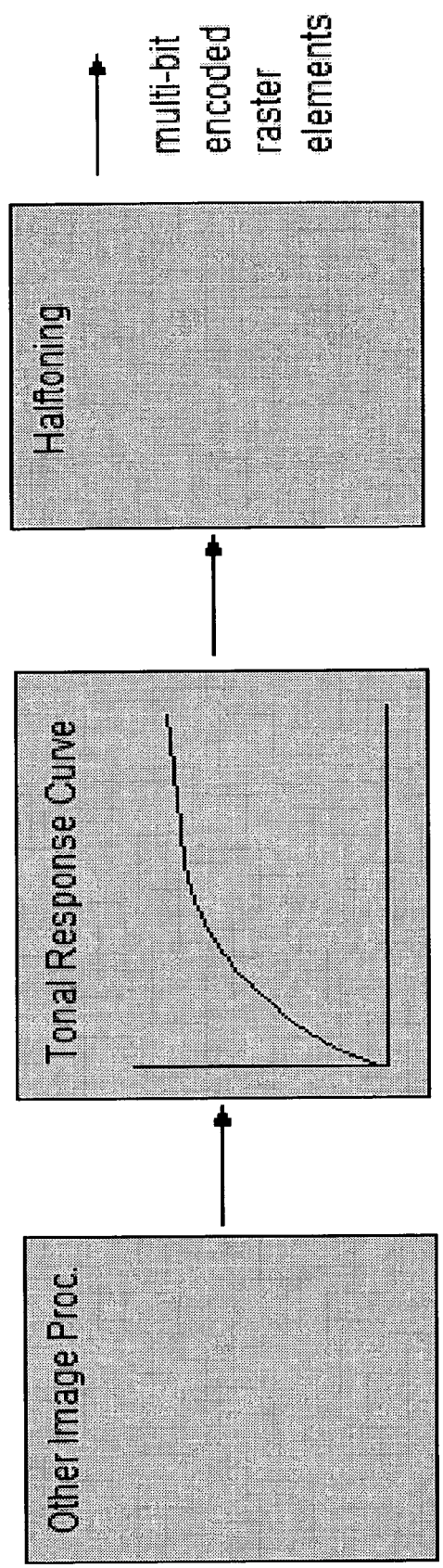
FIG. 6 is a schematic illustration showing how a tonal response curve can be used before halftoning to compensate for non-linearities between encoding and effective intensity.

From an image processing standpoint, it is generally most desirable to be working with encoded intensities which are linear. This can be accomplished even in the case of non-linear multi-bit interpretations by using a 1D table to compensate for the non-linearities. For instance, such a table could be used prior to the halftoning stage of the image processing. This allows all preceding image processing to be performed in an essentially linear space, as shown in FIG. 6.

Alternatively, the compensation for non-linearities of the encoded intensities can be built into the color space conversion table, if one exists.

Other Multi-Bit Interpretations

Many other interesting multi-bit interpretations are possible in the printing system of the present invention. The multi-bit raster elements need not be 2-bit values but, of course, can also be 3-bit, 4-bit, etc. Also, the encodings also need not be interpreted as a single drop from a particular nozzle. Rather, an encoding can be interpreted as representing one or more drops from one or more different types of nozzles.

Consider, for instance, if the ink jet system contained only small and large drops (no dilute drops). In this case, one may choose an alternate set of interpretations for the encodings, as shown in FIG. 7.

In addition, the present invention can still be applied if only a single nozzle type is to be used. For instance, if only small nozzles were present, the set of interpretations for the multi-bit encodings could be as shown in FIG. 8 or, alternatively, as shown in FIG. 9.

The system of the present invention also offers an advantage in these latter cases, i.e., in which only a single nozzle type is present. More particularly, with respect to the memory requirements, since the system of the present invention requires up to three or four drops per raster element, memory can be saved by using multi-bit raster elements (2-bits per raster position for the present invention compared with ¾ bits per raster position with the prior approaches). Likewise, the computational complexity for the multi-bit raster elements used in the present invention is much less than for the individual rasters.

In these latter cases, i.e., in systems in which only a single nozzle type is present, it has been considered that prior approaches may employ multiple (three or four) bitonal rasters with identical drop types. In reality, it is more likely that traditional approaches would have used a single raster at increased resolution rather than multiple rasters. For instance, instead of the four rasters of the example described above, a single raster with twice the horizontal and vertical resolution would likely have been used. A higher resolution raster such as this would enable four drops to be placed in the same area corresponding to a single raster element in the original resolution rasters. From a memory size and computational point of view, it can be seen that the novel system of the present invention offers similar advantages over such a single higher resolution raster.

The higher resolution raster does, of course, offer the ability to place pixel (and thus image edges) with more precision than is generally possible with the multi-bit technique of the present invention. In many cases, however, the increased pixel placement precision yields only negligible image quality improvement.

In a particular embodiment, a printing system comprises a set of nozzles for applying a color component, wherein each of the nozzles in the set is configured to apply a different effective color or intensity. The printing system also includes a raster associated with the set of nozzles. The raster comprises a plurality of cells. Each cell in the plurality of cells comprises at least one element which represents the effective color intensity to be applied to an area by the set of nozzles. The number of elements in a cell is less than the range of different effective color intensities.

The printing system may further comprise a second set of nozzles for applying a second color component. Each of the nozzles in the second set is configured to apply a different effective color intensity. The printing system may also include a second raster associated with the second set of nozzles. The second raster comprising a second plurality of cells. Each cell in the second plurality of cells comprises at least one element which represents the effective color intensity to be applied to an area by the second set of nozzles. The number of elements in a cell is less than the range of different effective color intensities.

The printing system may further comprise a third set of nozzles for applying a third color component. Each of the nozzles in the third set is configured to apply a different effective color intensity. The printing system may also include a third raster associated with the third set of nozzles. The third raster comprising a third plurality of cells. Each cell in the third plurality of cells comprises at least one element which represents the effective color intensity to be applied to an area by the third set of nozzles. The number of elements in a cell is less than the range of different effective color intensities.

The printing system may further comprise an alpha nozzle for applying an alpha color component and an alpha raster associated with the alpha nozzle. The alpha raster comprising an alpha plurality of cells. Each cell in the alpha plurality of cells represents the effective color intensity to be applied to an area by the alpha nozzle.

The printing system may also comprise where at least one of the raster, the second raster and the third raster comprises cells each having a multi-bit element.

The printing system may also comprise where the multi-bit element is a two-bit element.

The printing system may also comprise where wherein the alpha raster comprises cells each having a one-bit element.

The printing system may also comprise where the color component comprises cyan, the second color component comprises magenta, the third color component comprises yellow and the alpha color component comprises black.

The printing system may also comprise where each of the nozzles in its associated set is configured to deposit a different type ink drop.

The printing system may also comprise where each of the nozzles in its associated set is configured to deposit a different size ink drop.

The printing system may also comprise where each of the nozzles in its associated set is configured to deposit a different dilution ink drop.

The printing system may also comprise where the multi-bit elements of the cells utilize a binary code which maps to increasing effective color intensity.

The printing system may also comprise where the mapping is linear.

The printing system may also comprise where the mapping is non-linear.

In another particular embodiment, a method for printing comprises providing a set of nozzles for applying a color component. Each of the nozzles in the set is configured to apply a different effective color intensity. The method also comprises providing a raster associated with the set of nozzles. The raster comprising a plurality of cells. Each cell in the plurality of cells comprises at least one element which represents the effective color intensity to be applied to an area by the set of nozzles. The number of elements in a cell is less than the range of different effective color intensities. The method also comprises reading the raster whereby to control the operation of the set of nozzles.

The method may also comprise providing a second set of nozzles for applying a second color component. Each of the nozzles in the second set is configured to apply a different effective color intensity. The method may also include providing a second raster associated with the second set of nozzles. The second raster comprising a second plurality of cells. Each cell in the second plurality of cells comprises at least one element which represents the effective color intensity to be applied to an area by the second set of nozzles. The number of elements in a cell is less than the range of different effective color intensities. The method may also comprise reading the second raster whereby to control the operation of the second set of nozzles.

The method may also comprise providing a third set of nozzles for applying a third color component. Each of the nozzles in the third set is configured to apply a different effective color intensity. The method may also comprise providing a third raster associated with the third set of nozzles. The third raster comprising a third plurality of cells. Each cell in the third plurality of cells comprises at least one element which represents the effective color intensity to be applied to an area by the third set of nozzles. The number of elements in a cell is less than the range of different effective color intensities. The method may also comprise reading the third raster whereby to control the operation of the third set of nozzles.

The method may further comprise providing an alpha nozzle for applying a alpha color component. The method may also comprise providing an alpha raster associated with the alpha nozzle; the alpha raster comprising an alpha plurality of cells. Each cell in the alpha plurality of cells represents the effective color intensity to be applied to an area by the alpha nozzle. The method may also comprise reading the alpha raster whereby to control the operation of the alpha nozzle.

The method may also include where at least one of the raster, the second raster and the third raster comprises cells each having a multi-bit element.

The method may also include wherein the multi-bit element is a two-bit element.

The method may also include wherein the alpha raster comprises cells each having a one-bit element.

The method may also include wherein the color component comprises cyan, the second color component comprises magenta, the third color component comprises yellow and the alpha color component comprises black The method may also include wherein each of the nozzles in its associated set is configured to deposit a different type ink drop.

The method may also include wherein each of the nozzles in its associated set is configured to deposit a different size ink drop.

The method may also include wherein each of the nozzles in its associated set is configured to deposit a different dilution ink drop.

The method may also include wherein the multi-bit elements of the cells utilize a binary code which maps to increasing effective color intensity.

The method may also include wherein the mapping is linear.

The method may also include wherein the mapping is non-linear.

In a particular embodiment, a printing system comprises a set of nozzles for applying a color component. Each of the nozzles in the set is configured to apply a different effective color intensity. The printing system also comprises a raster associated with the set of nozzles. The raster comprising a plurality of cells where each cell in the plurality of cells represents the effective color intensity to be applied to an area by the set of nozzles. The printing system also includes wherein each cell in the plurality of cells comprises a single non-vector element.

The printing system may further comprise a set of nozzles for applying a color component and a raster associated with the set of nozzles. The raster comprising a plurality of cells where each cell in the plurality of cells represents the effective color intensity to be applied to an area by the set of nozzles. The printing system may also include wherein each of the different effective color intensities defined by the cell is achieved by a programmable combination of one or more of ink drop size and formulation.

The printing system may also include wherein each of the effective color intensities defined by the cell is achieved by a programmable combination of one or more of ink drop size, ink drop number and formulation.

ADDITIONAL EMBODIMENTS

It will be appreciated that still further embodiments of the present invention will be apparent to those skilled in the art in view of the present disclosure. It is to be understood that the present invention is by no means limited to the particular constructions herein disclosed and/or shown in the drawings, but also comprises any modifications or equivalents within the scope of the invention.

What is claimed is:

1. A printing system comprising:
a first set of nozzles for applying a first color component, wherein each of the nozzles in the first set is configured to apply a different effective color intensity; and
a first raster associated with the first set of nozzles, the raster comprising a plurality of cells;
wherein each cell in the plurality of cells comprises at least one element that represents a total effective first color intensity to be applied to an area by the first set of nozzles, wherein the number of elements in each cell is less than a range of different total effective first color intensities; and
wherein a tonal response curve is to be applied to the at least one element included in the plurality of cells, wherein applying the tonal response curve to the at least one element produces transformed data to replace the element.

2. A printing system according to claim 1, further comprising:
a second set of nozzles for applying a second color component, wherein each of the nozzles in the second set is configured to apply a different effective second color intensity; and
a second raster associated with the second set of nozzles, the second raster comprising a second plurality of cells;
wherein each cell in the second plurality of cells comprises at least one element which represents a total effective second color intensity to be applied to the area by the second set of nozzles, wherein the number of elements in each cell is less than the range of different effective second color intensities.

3. A printing system according to claim 2, further comprising:
a third set of nozzles for applying a third color component, wherein each of the nozzles in the third set is configured to apply a different effective third color intensity; and
a third raster associated with the third set of nozzles, the third raster comprising a third plurality of cells;
wherein each cell in the third plurality of cells comprises at least one element which represents a total effective third color intensity to be applied to the area by the third set of nozzles, wherein the number of elements in each cell is less than the range of different total effective third color intensities.

4. A printing system according to claim 3, wherein each of the nozzles in its associated set is configured to deposit an ink drop of a particular type that differs from the type deposited by any of the other nozzles in its associated set.

5. A printing system according to claim 3, wherein each of the nozzles in its associated set is configured to deposit an ink drop having an ink drop size within a particular range of ink drop sizes that differs from the range of ink drop sizes of the other nozzles in its associated set.

6. A printing system according to claim 3, wherein each of the nozzles in its associated set is configured to deposit an ink drop having a particular level of dilution that differs from the level of dilution of the other nozzles in its associated set.

7. A printing system according to claim 1, further comprising:
an alpha nozzle to apply an alpha color component; and
an alpha raster associated with the alpha nozzle;
the alpha raster comprising an alpha plurality of cells, wherein each cell in the alpha plurality of cells represents the total effective alpha color intensity to be applied to the area by the alpha nozzle.

8. A printing system according to claim 7, wherein the alpha raster comprises cells each having a one-bit element.

9. A printing system according to claim 7, wherein the alpha color component comprises a black color.

10. A printing system according to claim 1, wherein at least one of the first raster, the second raster and the third raster comprises cells each having a multi-bit element.

11. A printing system according to claim 10, wherein the multi-bit element comprises more than two bits.

12. A printing system according to claim 10, wherein the multi-bit elements of the cells utilize a binary code corresponding to effective color intensity.

13. A printing system according to claim 12, wherein the correspondence is linear.

14. A printing system according to claim 12 wherein the correspondence is non-linear.

15. A method for printing comprising:
providing a first set of nozzles for applying a color component, wherein each of the nozzles in the set is configured to apply a different effective color intensity;
providing a first raster associated with the first set of nozzles, the first raster comprising a first plurality of cells, wherein each cell in the first plurality of cells comprises at least one element that represents a total effective first color intensity to be applied to an area by the first set of nozzles, wherein the number of elements in each cell is less than a range of total effective first color intensities;
applying a tonal response curve to the at least one element, producing transformed data to replace the at least one element; and
reading the first raster to control an operation of the first set of nozzles.

16. A method according to claim 15 further comprising:
providing a second set of nozzles for applying a second color component, wherein each of the nozzles in the second set is configured to apply a different effective second color intensity;
providing a second raster associated with the second set of nozzles, the second raster comprising a second plurality of cells, wherein each cell in the second plurality of cells comprises at least one element that represents a total effective second color intensity to be applied to the area by the second set of nozzles, wherein the number of elements in a cell is less than a range of total effective second color intensities; and
reading the second raster to control the operation of the second set of nozzles.

17. A method according to claim 16 further comprising:
providing a third set of nozzles for applying a third color component, wherein each of the nozzles in the third set is configured to apply a different effective third color intensity;
providing a third raster associated with the third set of nozzles, the third raster comprising a third plurality of cells, wherein each cell in the third plurality of cells comprises at least one element that represents a total effective third color intensity to be applied to the area by the third set of nozzles, wherein the number of elements in a cell is less than a range of total effective third color intensities; and
reading the third raster to control the operation of the third set of nozzles.

18. A method according to claim 17 wherein at least one of the first raster, the second raster and the third raster comprises cells having a multi-bit element.

19. A method according to claim 18 wherein the multi-bit element comprises more than two bits.

20. A method according to claim 17, wherein each of the nozzles in its associated set is configured to deposit an ink drop having a particular type that differs from the type deposited by any of the other nozzles in its associated set.

21. A method according to claim 17, wherein each of the nozzles in its associated set is configured to deposit an ink drop having an ink drop size within a particular range of ink drop sizes that differs from the range of ink drop sizes of the other nozzles in its associated set.

22. A method according to claim 17, wherein each of the nozzles in its associated set is configured to deposit an ink drop having a articular level of dilution that differs from the level of dilution of the other nozzles in its associated set.

23. A method according to claim 17, wherein the multi-bit elements of the cells utilize a binary code that corresponds to effective color intensity.

24. A method according to claim 23, wherein the correspondence is linear.

25. A method according to claim 23 wherein the correspondence is non-linear.

26. A method according to claim 15 further comprising:
providing an alpha nozzle for applying a alpha color component;
providing an alpha raster associated with the alpha nozzle, wherein the alpha raster comprises an alpha plurality of cells, wherein each cell in the alpha plurality of cells represents an effective alpha color intensity to be applied to the area by the alpha nozzle; and
reading the alpha raster to control the operation of the alpha nozzle.

27. A method according to claim 26 wherein the alpha raster comprises cells each having a one-bit element.

28. A method according to claim 26, wherein the alpha color component comprises a black color.

29. A printing system comprising:
a set of nozzles for applying a color component; and
a raster associated with the set of nozzles, the raster comprising a plurality of cells;
wherein each cell in the plurality of cells represents an effective color intensity to be applied to an area by the set of nozzles;
wherein each of the different effective color intensities defined by the cell is achieved by a programmable combination of one or more of ink drop size and formulation; and
wherein the programmable combination is at least partially determined based on a tonal response curve.

30. A printing system according to claim 29, wherein each of the effective color intensities defined by the cell is achieved by a programmable combination of one or more of ink drop size, ink drop number, and formulation.

31. A method for printing comprising:
providing a set of nozzles for applying a color component, wherein each of the nozzles in the set is configured to apply a different effective color intensity;
providing a raster associated with the set of nozzles, the raster comprising a plurality of cells, wherein each cell in the plurality of cells comprises at least one element that represents a total effective color intensity to be applied to an area by the set of nozzles, wherein the number of elements in each cell is less than a range of total effective color intensity;
reading the raster;
modifying the raster reading according to a tonal response curve; and
controlling an operation of the set of nozzles according to the modified raster reading.

* * * * *